(12) United States Patent
Lee

(10) Patent No.: US 8,201,884 B2
(45) Date of Patent: Jun. 19, 2012

(54) CAPACITOR TYPE SEAT SENSOR

(75) Inventor: Seung Woo Lee, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 392 days.

(21) Appl. No.: 12/479,441

(22) Filed: Jun. 5, 2009

(65) Prior Publication Data

US 2010/0052380 A1    Mar. 4, 2010

(30) Foreign Application Priority Data

Aug. 26, 2008   (KR) .................. 10-2008-0083311

(51) Int. Cl.
*A47C 31/00*   (2006.01)

(52) U.S. Cl. ..................................... 297/217.3; 340/667

(58) Field of Classification Search ............... 297/217.3, 297/217.2, 180.12, 180.14; 340/666, 667
See application file for complete search history.

(56) References Cited

U.S. PATENT DOCUMENTS

| | | | |
|---|---|---|---|
| 6,877,808 B2 * | 4/2005 | Lichtinger et al. | 297/217.3 |
| 7,370,911 B2 * | 5/2008 | Bajic et al. | 297/180.12 |
| 7,500,536 B2 * | 3/2009 | Bulgajewski et al. | 180/273 |
| 7,516,809 B2 * | 4/2009 | Hetzenecker et al. | 180/273 |
| 7,575,085 B2 * | 8/2009 | Kamizono et al. | 180/273 |
| 7,669,928 B2 * | 3/2010 | Snyder | 297/284.11 |
| 7,669,929 B2 * | 3/2010 | Simon et al. | 297/284.11 |
| 7,859,423 B2 * | 12/2010 | Yamanaka et al. | 340/667 |
| 2007/0115121 A1 * | 5/2007 | Schleeh | 340/562 |
| 2008/0011732 A1 * | 1/2008 | Ito et al. | 219/217 |

* cited by examiner

*Primary Examiner* — David Dunn
*Assistant Examiner* — Tania Abraham
(74) *Attorney, Agent, or Firm* — Morgan, Lewis & Bockius LLP

(57) ABSTRACT

A capacitor seat sensor includes a cushion pad for a vehicle seat, protective panels installed on an upper surface of the cushion pad, including upper, intermediate and lower sheets, and extending a predetermined distance beyond a front end of the cushion pad, conductive panels including a sensor antenna panel and a sensor guard panel which is respectively interposed between the upper and intermediate sheets of the protective panels and between the intermediate and lower sheets of the protective panels to detect the presence of an occupant on the cushion pad, and a fastener for fastening front end portions of the protective panels onto a lower end of the cushion pad so as to prevent the conductive panels from wrinkling.

8 Claims, 6 Drawing Sheets

CAPACITOR TYPE SEAT SENSOR

CROSS-REFERENCE TO RELATED APPLICATIONS

The present application claims priority to Korean Patent Application Number 10-2008-0083311 filed Aug. 26, 2008, the entire contents of which application is incorporated herein for all purposes by this reference.

BACKGROUND OF THE INVENTION

1. Field of the Invention

The present invention relates to a capacitor type seat sensor which is installed in a vehicle seat to sense the presence of an occupant on the vehicle seat and can prevent conductive panels as component parts of the seat sensor from becoming wrinkled.

2. Description of Related Art

These days, an air bag system is installed in a vehicle such that in case of a crash, an air bag can be deployed in response to a signal from an acceleration sensor so as to prevent an occupant from being injured.

In case of a crash, it is necessary to determine whether the air bag must be deployed or not and, when it is determined to deploy the air bag, it is required that an inflator be actuated under precise control.

In the course of this, the presence of an occupant on a vehicle seat, the weight of the occupant, etc. should be taken into consideration. In order to obtain such information, a capacitor type seat sensor is used to detect the presence of an occupant on a vehicle seat, and a weight sensor is used to sense the weight of the occupant to thereby distinguish between an adult and a child.

Referring to FIG. 1, in a conventional capacitor type seat sensor, three sheets of protective panels 10 made of felt are stacked one upon another, and conductive panels 22 and 24 are interposed between the protective panels 12, 14 and 16, so that a control unit 30 can determine the presence of an occupant on a vehicle seat owing to an increase or a decrease in capacitance.

Because most of the human body is made up of water, when an occupant sits on a vehicle seat, the dielectric constant of the conductive panels 22 and 24 changes, and therefore, the presence of an occupant on a vehicle seat can be detected by a change in capacitance.

FIG. 2 illustrates the installation structure of the conventional capacitor type seat sensor. Character lines 52 are formed left and right on a vehicle seat 50. Both side ends of the protective panels 10 are fastened along the character lines 52 by means of hog rings 60, etc. The conductive panels 20 are interposed between the protective panels 12, 14 and 16 using an adhesive or some other means.

The conventional capacitor type seat sensor has a problem in that hog rings cannot be used at the front ends of the protective panels 10 due to the deterioration of the occupant's riding comfort and as a result, front end portions 18 of the protective panels 10 extending beyond the foremost hog rings 62 are likely to be wrinkled or pushed rearward due to the occupant's repeated boarding and deboarding. As the front end portions 18 of the protective panels 10 are pushed rearward, front end portions 26 of the conductive panels 20 are also pushed rearward. In this case, because the front end portions 26 of the conductive panels 20 are likely to be wrinkled, a situation can occur in which the capacitor type seat sensor erroneously detects the presence of an occupant on a vehicle seat and causes inappropriate deployment of an air bag.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Accordingly, the present invention has been made keeping in mind the above problems occurring in the related art, and various aspects of the present invention provide for a capacitor type seat sensor wherein the front ends of conductive panels are prevented from being wrinkled or crumpled so that the presence of an occupant on a vehicle seat can be precisely detected.

One aspect of the present invention is directed to a capacitor seat sensor including a cushion pad for a vehicle seat, protective panels installed on an upper surface of the cushion pad, including upper, intermediate and lower sheets, and extending a predetermined distance beyond a front end of the cushion pad, conductive panels including a sensor antenna panel and a sensor guard panel which may be respectively interposed between the upper and intermediate sheets of the protective panels and between the intermediate and lower sheets of the protective panels to detect the presence of an occupant on the cushion pad, and/or a fastener for fastening front end portions of the protective panels onto a lower end of the cushion pad so as to prevent the conductive panels from wrinkling.

The fastener may include a spring which may be arranged below the cushion pad and may be pulled rearward when the occupant sits on the vehicle seat. The spring may be installed on a seat frame which supports the cushion pad. The front end portions of the protective panels may be fastened to a lower surface of the cushion pad by the fastener after being wrapped over the front end of the cushion pad. The front end portions of the protective panels may be fastened to a lower surface of the cushion pad by the fastener after being passed downward through a front portion of the cushion pad. The fastener may include hog rings or hook and loop fastener strips. The protective panels may be made of felt, and the conductive panels may be made of cloth surface-treated with a conductive material.

Other aspects of the present invention are directed to vehicle seats including the above-described capacitor seat sensors, and further still, to passenger vehicles including the vehicle seats.

Another aspect of the present invention is directed to a sensor, including a cushion pad for a vehicle seat, an upper, an intermediate, and a lower protective panel, disposed within the cushion pad, an upper conductive panel disposed between the upper and intermediate protective panels, and a lower conductive panel disposed between the intermediate and lower protective panels, and/or a fastener that fastens front end portions of the protective panels onto a lower surface of the cushion pad.

The fastener may include a spring below the cushion pad. The spring may be attached to a seat frame which supports the cushion pad. The front end portions of the protective panels may wrap around a front end of the cushion pad. The front end portions of the protective panels may extend downward through the cushion pad. The fastener may include at least one hog ring. The fastener may include a hook and loop fastener.

The protective panels may include felt. The conductive panels include cloth, surface-treated with a conductive material.

Further aspects of the present invention are directed to vehicle seats including the above-described seat sensors, and further still, to passenger vehicles including such vehicle seats.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
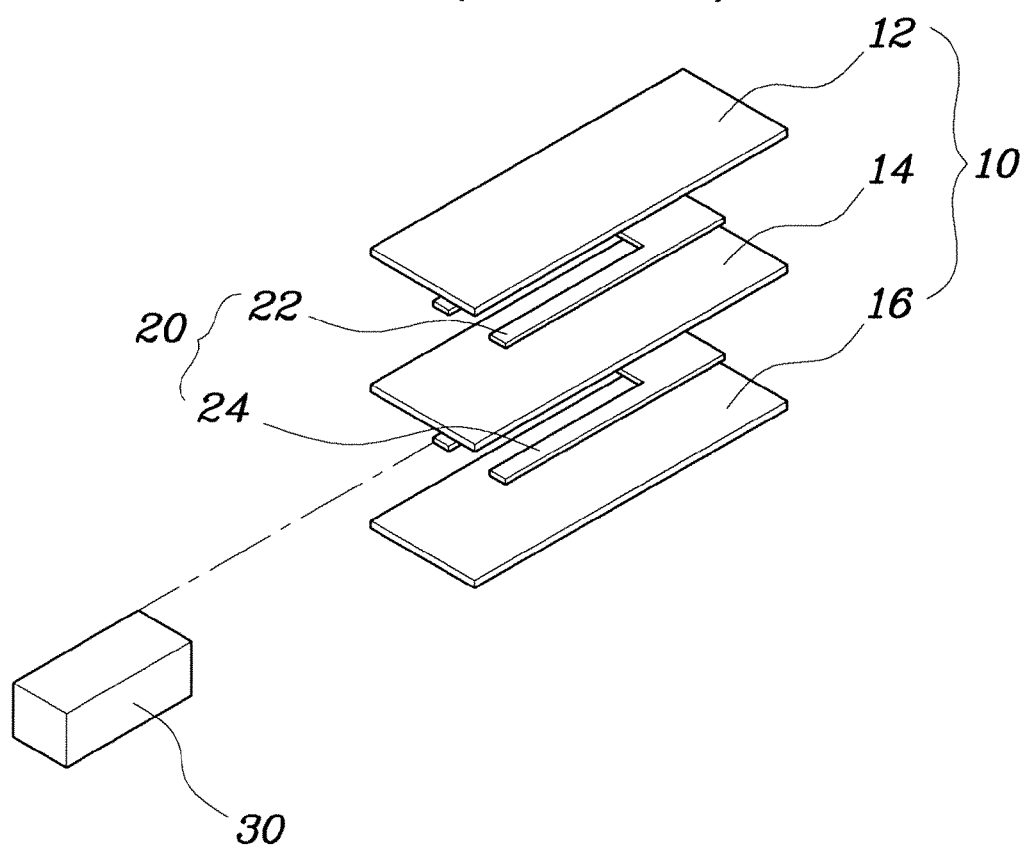
FIG. 1 is a perspective view illustrating the construction of a conventional capacitor type seat sensor.
Figure 2:
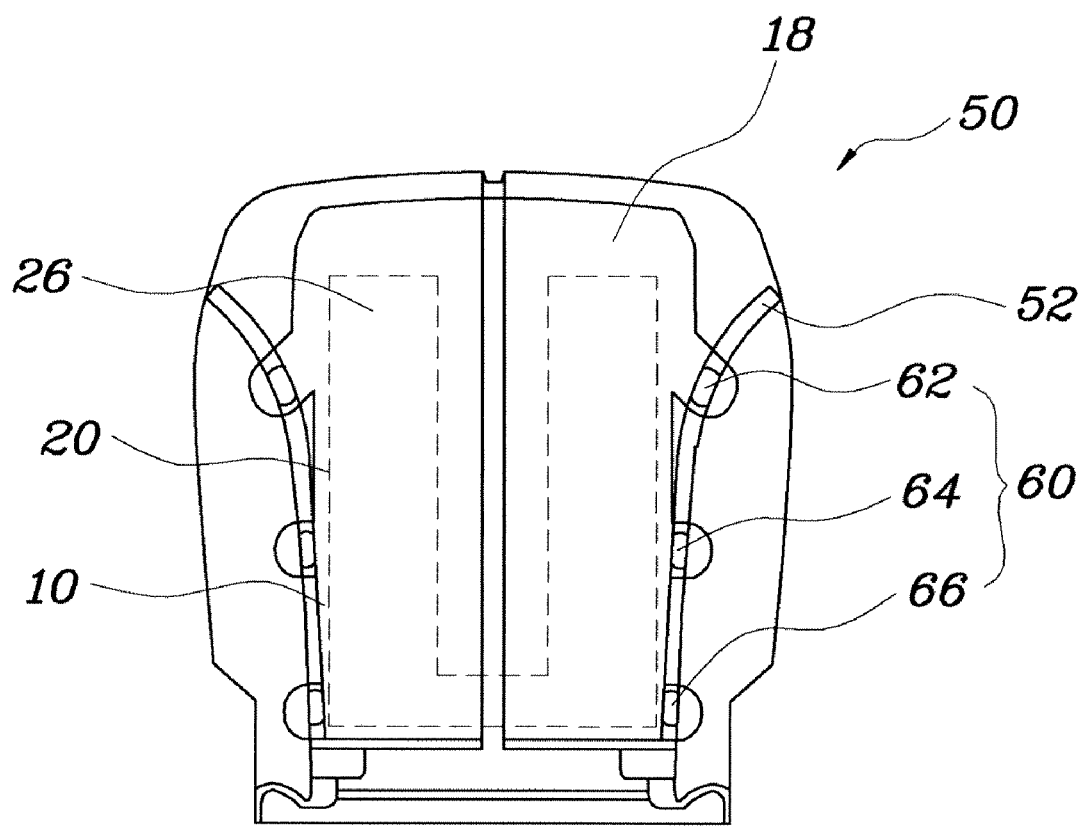
FIG. 2 is a plan view illustrating the state in which the conventional capacitor type seat sensor is installed.
Figure 3:
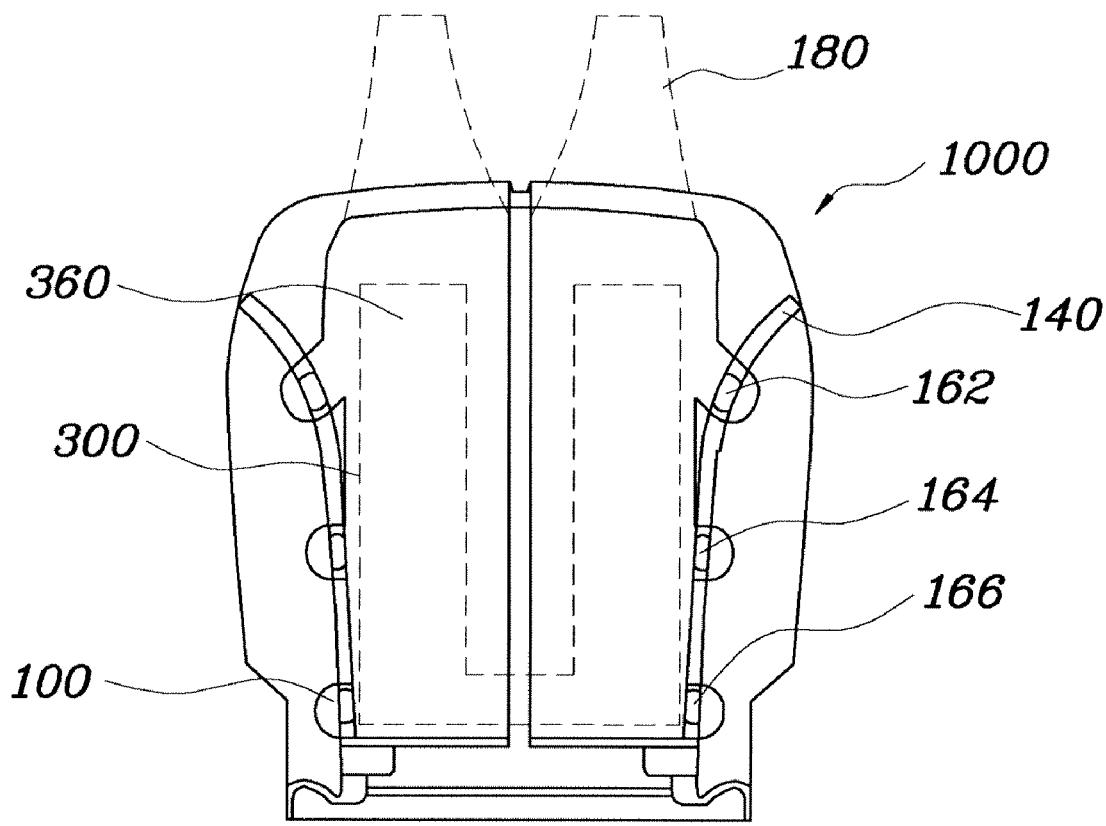
FIG. 3 is a plan view illustrating the state in which an exemplary capacitor type seat sensor according to the present invention is installed.

FIG. 3 is a view illustrating the construction of a capacitor type seat sensor according to the present invention.

An exemplary seat sensor includes a cushion pad 1000 for a vehicle seat; protective panels 100 installed on the upper surface of the cushion pad 1000, composed of upper, intermediate and lower sheets 120, 140 and 160, and extending by a predetermined distance beyond the front end of the cushion pad 1000; conductive panels 300 composed of a sensor antenna panel 320 and a sensor guard panel 340 which are respectively interposed between the upper and intermediate sheets of the protective panels 120 and 140 and between the intermediate and lower sheets of the protective panels 140 and 160 to detect the presence of an occupant on the cushion pad 1000; and a fastener for fastening front end portions 180 of the protective panels 100 on a lower end of the cushion pad 1000 so as to prevent the conductive panels 300 from becoming wrinkled.

The protective panels 100 may be made of felt, and the conductive panels 300 may be made of cloth, surface-treated with a conductive material. The protective panels 100 are composed of the upper, intermediate and lower sheets of protective panels 120, 140 and 160, the front ends of the protective panels 100 extend beyond the front end of the cushion pad 1000. Both sides of the protective panels 100 are fastened along character lines or seams 140 of the cushion pad 1000 by means of hog rings 162, 164 and 166. The conductive panels 320 and 340 are interposed and secured between the protective panels 120, 140 and 160.

The conductive panels 300 include the sensor antennal panel 320 which is secured between the upper and intermediate sheets of protective panels 120 and 140, and the sensor guard panel 340 which is secured between the intermediate and lower sheets of protective panels 140 and 160. These panels 320 and 340 are connected to a control unit so that the control unit can determine the presence of an occupant on the vehicle seat in response to signals from the panels 320 and 340. Also, as shown in FIG. 3, front end portions 360 of the conductive panels 300 extend forward beyond the foremost hog rings 162. In this regard, due to the fact that the front end portions 180 of the protective panels 100 are fastened to the cushion pad 1000 as will be described below in detail, the front end portions 360 of the conductive panels 300 are prevented from becoming wrinkled.

The fastener functions to fasten the front end portions 180 of the protective panels 100, which extend beyond the front end of the cushion pad 1000, onto the lower end of the cushion pad 1000. The fastener can be constituted according to various embodiments of the present invention, some of which will be described below.

Figure 4:
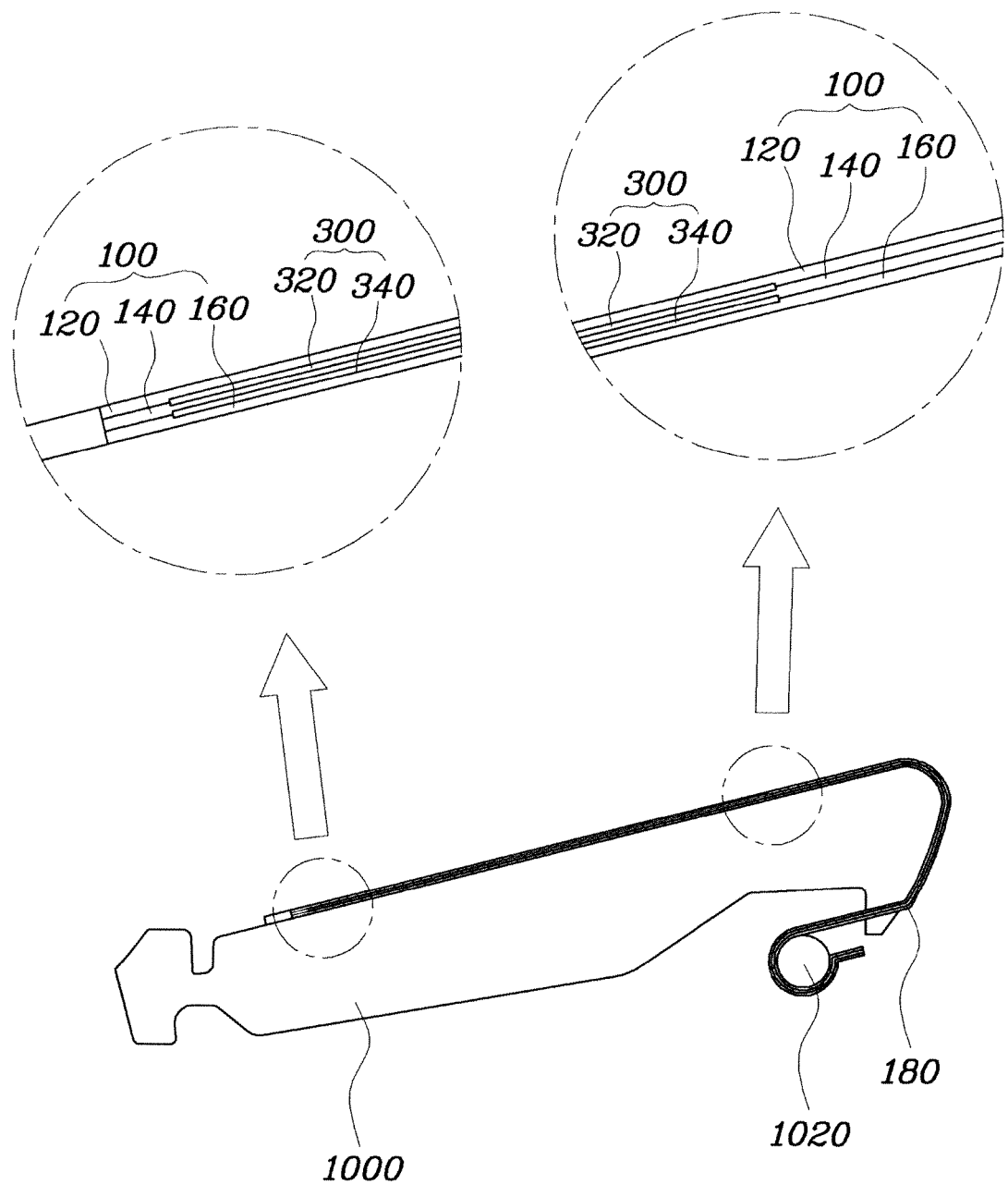
FIG. 4 is a partially enlarged sectional view of an exemplary capacitor type seat sensor in accordance the present invention.

FIG. 4 illustrates an exemplary fastener in accordance with the present invention. The fastener includes a spring 1020 below the cushion pad 1000. The spring 1020 may be installed on a seat frame 500 which supports the cushion pad 1000. The front end portions 180 of the protective panels 100 are connected to the spring 1020 and are always under the tensile force of the spring 1020, so that the protective panels 100 and the conductive panels 300 are prevented from wrinkling.

Figure 5:
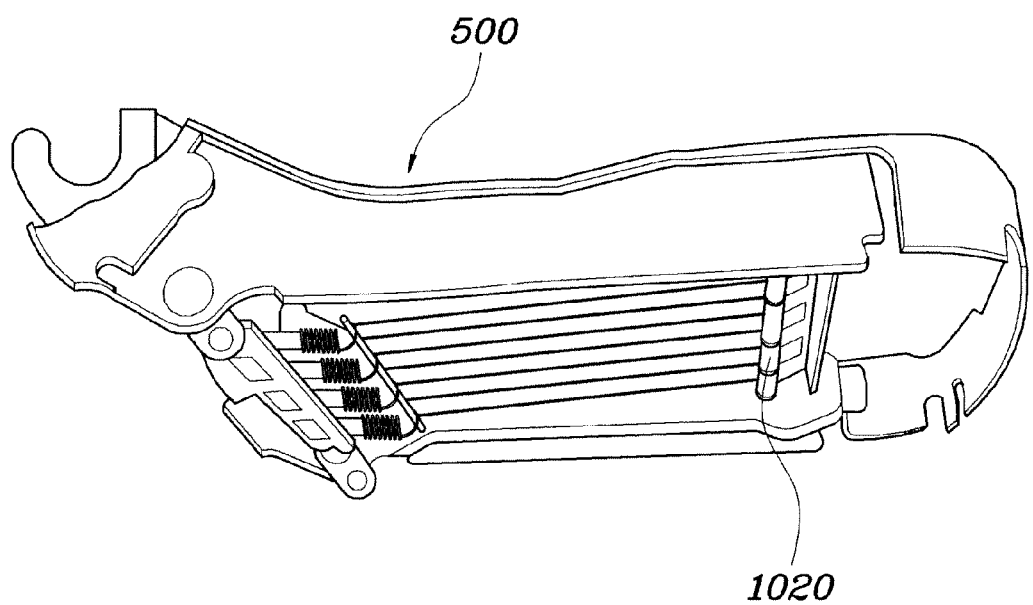
FIG. 5 is a bottom perspective view illustrating a seat frame.

The spring 1020 may be separately provided on the lower end of the cushion pad 1000 or may be a spring installed on the seat frame 500 on which the cushion pad 1000 is placed. Referring to FIG. 5 which illustrates the seat frame 500, a plurality of springs for supporting the cushion pad 1000 are generally installed in the lower portion of the seat frame 500. These springs are pulled rearward while being flexed downward when the occupant sits on the vehicle seat. A leaf spring 1020 is connected to the front ends of the springs, and the front end portions 180 of the protective panels 100 may be connected to the leaf spring 1020 and pulled rearward when the occupant sits on the vehicle seat.

Figure 6:
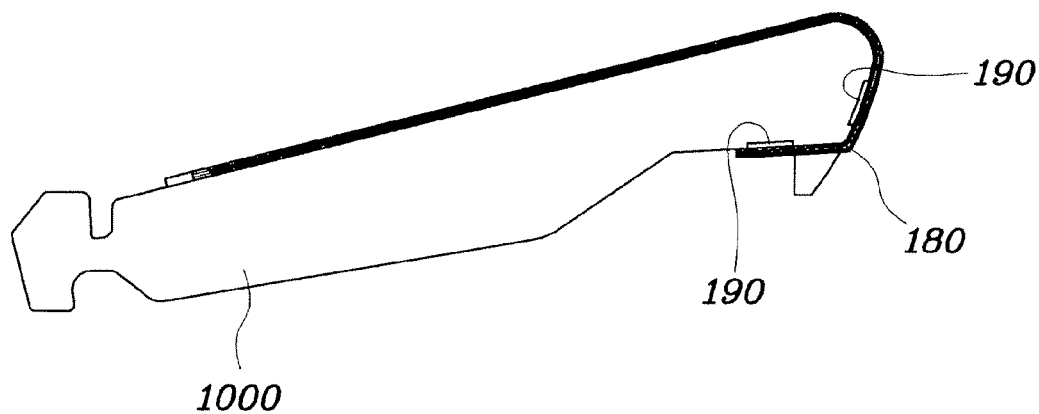
FIG. 6 is a sectional view of another exemplary capacitor type seat sensor in accordance with the present invention.

FIG. 6 illustrates another exemplary fastener according to the present invention. The front end portions 180 of the protective panels 100 are fastened to the lower surface of the cushion pad 1000 by the fastener after being wrapped over the front end of the cushion pad 1000. The fastener can comprise hog rings or hook and loop fastener strips 190, for example, Velcro®hook and loop fasteners strips, and other suitable strips. The hook and loop fastener strips 190 indicate the so-called magic tapes. In the case of the hook and loop fastener strips 190, fastening positions can be freely changed, and therefore, the present invention can be applied to seats having various sizes and shapes.

Figure 7:
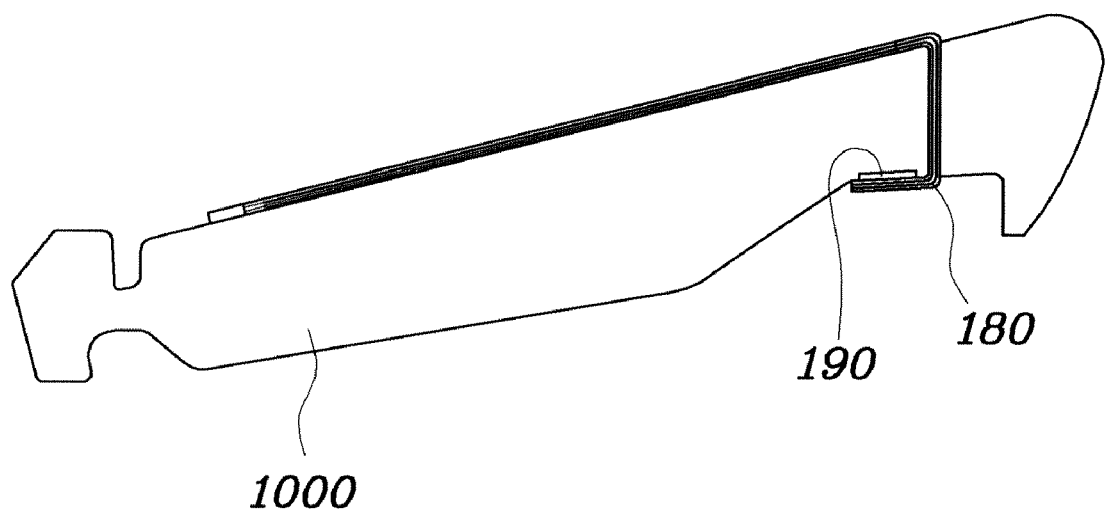
FIG. 7 is a sectional view of another exemplary capacitor type seat sensor in accordance with the present invention.

FIG. 7 illustrates another exemplary fastener in accordance with the present invention. The front end portions 180 of the protective panels 100 are fastened to the lower surface of the cushion pad 1000 by the fastener after being passed downward through the front portion of the cushion pad 1000. The fastener can comprise hog rings or hook and loop fastener strips 190. The front end portions 180 of the protective panels 100 extend downwards through the front portion of the cushion pad 1000 and are then bent rearward along the lower surface of the cushion pad 1000. Thereupon, the front end portions 180 are fastened to the cushion pad 1000 by the medium of the hook and loop fastener strips 190.

By the above-described embodiments, the front end portions 180 of the protective panels 100 are prevented from being pushed or wrinkling, and according to this, the front end portions 360 of the conductive panels 300 are also prevented from being pushed or wrinkling.

As is apparent from the above description, the capacitor type seat sensor according to the present invention, constructed as mentioned above, provides advantages in that, since the front ends of protective panels are fastened to the lower end of a cushion pad, the protective panels are not pushed rearward, and, as a consequence, conductive panels, which are interposed between the protective panels, are prevented from being pushed rearward.

Also, as the conductive panels are prevented from being pushed rearward, erroneous detection of the presence of an occupant on a vehicle seat is prevented.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A capacitor seat sensor apparatus comprising:
   a cushion pad for a vehicle seat;
   protective panels installed on an upper surface of the cushion pad, including upper, intermediate and lower sheets, and extending a predetermined distance beyond a front end of the cushion pad;
   conductive panels including a sensor antenna panel and a sensor guard panel which are respectively interposed between the upper and intermediate sheets of the protective panels and between the intermediate and lower sheets of the protective panels to detect the presence of an occupant on the cushion pad; and
   a fastener for fastening front end portions of the protective panels onto a lower end of the cushion pad so as to prevent the conductive panels from wrinkling;
   wherein the fastener includes a spring which is arranged below the cushion pad and is connected to the front end portions of the protective panels.

2. The capacitor seat sensor apparatus according to claim 1, wherein the spring is installed on a seat frame which supports the cushion pad.

3. The capacitor seat sensor apparatus according to claim 1, wherein the front end portions of the protective panels are fastened to a lower surface of the cushion pad by the fastener after being wrapped over the front end of the cushion pad.

4. The capacitor seat sensor apparatus according to claim 1, wherein the front end portions of the protective panels are fastened to a lower surface of the cushion pad by the fastener after being passed downward through a front portion of the cushion pad.

5. The capacitor seat sensor apparatus according to claim 1, wherein the fastener comprises hog rings or hook and loop fastener strips.

6. The capacitor seat sensor apparatus according to claim 1, wherein the protective panels are made of felt, and the conductive panels are made of cloth surface-treated with a conductive material.

7. A vehicle seat comprising the capacitor seat sensor according to claim 1.

8. A passenger vehicle comprising the vehicle seat of claim 7.

* * * * *